US008360309B2

(12) United States Patent
Duncan et al.

(10) Patent No.: US 8,360,309 B2
(45) Date of Patent: Jan. 29, 2013

(54) REDUCING TRANSACTION TIME IN A SELF-SERVICE TERMINAL

(75) Inventors: Philip A. Duncan, Dundee (GB); Stefano Cipollone, Milan (IT)

(73) Assignee: NCR Corporation, Duluth, GA (US)

( * ) Notice: Subject to any disclaimer, the term of this patent is extended or adjusted under 35 U.S.C. 154(b) by 1147 days.

(21) Appl. No.: 12/004,365

(22) Filed: Dec. 20, 2007

(65) Prior Publication Data

US 2009/0162184 A1 Jun. 25, 2009

(51) Int. Cl.
*G06Q 40/00* (2006.01)
*G07D 11/00* (2006.01)
*G07F 19/00* (2006.01)

(52) U.S. Cl. .......................................................... 235/379

(58) Field of Classification Search .................. 235/379, 235/383; 705/39–45; 902/2, 14
See application file for complete search history.

(56) References Cited

U.S. PATENT DOCUMENTS

| | | | | |
|---|---|---|---|---|
| 4,185,646 | A * | 1/1980 | Woods et al. | 221/93 |
| 4,319,132 | A * | 3/1982 | Guibord et al. | 235/379 |
| 5,389,773 | A | 2/1995 | Coutts et al. | |
| 7,175,076 | B1 * | 2/2007 | Block et al. | 235/379 |
| 7,513,414 | B1 * | 4/2009 | Block et al. | 235/379 |
| 7,784,680 | B1 * | 8/2010 | Mason et al. | 235/379 |
| 7,843,339 | B2 * | 11/2010 | Kirmayer | 340/562 |
| 2002/0092905 | A1 * | 7/2002 | Katou et al. | 235/379 |
| 2004/0256450 | A1 * | 12/2004 | Fujioka | 235/379 |
| 2005/0023341 | A1 * | 2/2005 | Taniyama et al. | 235/379 |
| 2007/0069007 | A1 * | 3/2007 | Molbak | 235/379 |

* cited by examiner

*Primary Examiner* — Tuyen K Vo
(74) *Attorney, Agent, or Firm* — Paul W. Martin

(57) ABSTRACT

Methods of reducing transaction time in a self-service terminal are described. The methods involve pre-stacking a defined amount of media, such as a commonly withdrawn amount of money, before the user has performed any service selection. During service selection, the user is given an option to withdraw the defined amount of money and if the user selects this option, the pre-stacked amount is dispensed. If the user selects an option to withdraw a different amount of money, a second dispenser in the self-service terminal may be used to stack and dispense this different amount.

16 Claims, 5 Drawing Sheets

REDUCING TRANSACTION TIME IN A SELF-SERVICE TERMINAL

TECHNICAL FIELD

The present invention relates to reducing transaction time in a self-service terminal. It is particularly related to, but in no way limited to, dispensing pre-stacked media in a self-service terminal (SST) such as an automated teller machine (ATM), which may comprise a dual dispenser.

BACKGROUND

Typically a self-service terminal, such as an ATM, includes a single dispensing unit hidden behind a fascia which has set into it a keypad, a screen, a card insertion slot and/or identification device and a dispensing slot. However, some ATMs have been developed which include two dispensing units 101, 102, as shown in the schematic diagram shown in FIG. 1. The fascia 103 of the ATM includes a card insertion slot/identification device 104, a screen 105, which may be touch sensitive and therefore also act as a user input device, and two dispensing slots 106. Instead of (or in addition to) including a touch sensitive screen, the fascia may include function keys and/or a keypad (not shown in FIG. 1). Each of the dispensing units 101, 102 may include a dispenser 107, and one or more media cassettes 108. The inclusion of two dispensing units may be used to increase the capacity of the ATM and/or to increase the denominations, currencies or media types dispensed (e.g. where the cassettes 108 in each of the dispensing units contain a different denomination/currency/media type). The inclusion of two dispensing units may also be used for redundancy, with the second dispensing unit being used during downtime of the first dispensing unit (e.g. when it is out of order, being serviced, has a fault or has run out of media to dispense).

Whilst an ATM with dual dispensing units may increase the throughput of the machine through reduced downtime, for high volume applications it may be beneficial to further increase the throughput of the machine. One means to increase the throughput is to reduce the overall transaction time and this may also result in increased customer satisfaction.

One technique which is used to reduce the time taken by a customer to withdraw money is to provide the customer with a number of predefined amounts from which to select the amount they wish to withdraw. If the customer chooses one of these predefined amounts they need only push the button corresponding to the particular amount (or a particular function key or touch area, as appropriate); however to select a different amount they must push a button for ‘other’ and then enter the required amount using the keypad. By selecting one of the predefined amounts, the transaction time is shorter than when entering a bespoke amount and the overall throughput through the machine is increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods of reducing transaction time in a self-service terminal are described. The methods involve pre-stacking a defined amount of media, such as a commonly withdrawn amount of money, before the user has performed any service selection. During service selection, the user is given an option to withdraw the defined amount of money and if the user selects this option, the pre-stacked amount is dispensed. If the user selects an option to withdraw a different amount of money, a second dispenser in the self-service terminal may be used to stack and dispense this different amount.

A first aspect provides a method of operating a self-service terminal comprising:

stacking a defined amount of media; presenting a user of the self-service terminal with a plurality of options, one of the plurality of options corresponding to dispensing the defined amount of media; and on selection of said one of the plurality of options by the user, dispensing the stacked defined amount of media.

The defined amount of media may be determined according to the user of the self-service terminal and/or according to a history of use of the self-service terminal.

The method may further comprise: recycling the stacked defined amount of media if said one of the plurality of options is not selected by the user.

A second of the plurality of options may correspond to dispensing a different amount of media.

The self-service terminal may comprise a first and a second dispenser, the first dispenser being used for stacking and dispensing the defined amount of media, and the method may further comprise: on selection of said second of the plurality of options by the user, stacking and dispensing the different amount of media using the second dispenser.

The method may further comprise: alternating the dispenser used for stacking and dispensing the defined amount of media and the dispenser used for stacking and dispensing the different amount of media.

The method may further comprise: on selection of said second of the plurality of options, stacking additional media onto the defined amount of media to create a stack of the different amount of media; and dispensing the different amount of media.

The self-service terminal comprises a first and a second dispenser, the first dispenser being used for stacking and dispensing the defined amount of media, wherein the different amount of media comprises a second defined amount of media and wherein the method may further comprise: prior to presenting the user with the plurality of options, stacking the second defined amount of media using the second dispenser; and on selection of said second of the plurality of options by the user, dispensing the second defined amount of media using the second dispenser.

The step of stacking the defined amount of media may occur prior to presenting the user with a plurality of options during predefined time periods.

The step of stacking the defined amount of media may occur prior to authentication of the user.

The method may further comprise: purging the stacked defined amount of media on detection of a physical attack on the self-service terminal.

The self-service terminal may be an automated teller machine and wherein the media may be money. The defined amount of media may comprise a commonly dispensed amount of money.

A second aspect provides a computer program comprising computer program code means adapted to perform all the steps of any of the methods described above when said program is run on a computer.

The computer program may be embodied on a tangible computer readable medium.

A third aspect provides a self-service terminal comprising a dispenser arranged to:

stack a defined amount of media prior to service selection by a user; and dispense the stacked amount of media if selected by the user during service selection.

The self-service terminal may further comprise a second dispenser arranged to dispense an alternative amount of media if selected by the user during service selection.

The dispenser may be further arranged to: recycle the stacked amount of media if not selected by the user during service selection.

The defined amount may be determined according to the user of the self-service terminal.

A fourth aspect provides one or more tangible device-readable media with device-executable instructions for performing steps comprising: stacking a defined amount of media using a first dispenser in a self-service terminal; presenting a user with a plurality of options, one of the plurality of options corresponding to dispensing the defined amount of media; and on selection of said one of the plurality of options by the user, dispensing the stacked defined amount of media using the first dispenser.

A second of the plurality of options may correspond to dispensing a different amount of media and the one or more tangible device-readable media may further comprise device-executable table instructions for performing steps comprising: on selection of said second of the plurality of options by the user, stacking and dispensing the different amount of media using a second dispenser in the self-service terminal.

Many of the attendant features will be more readily appreciated as the same becomes better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
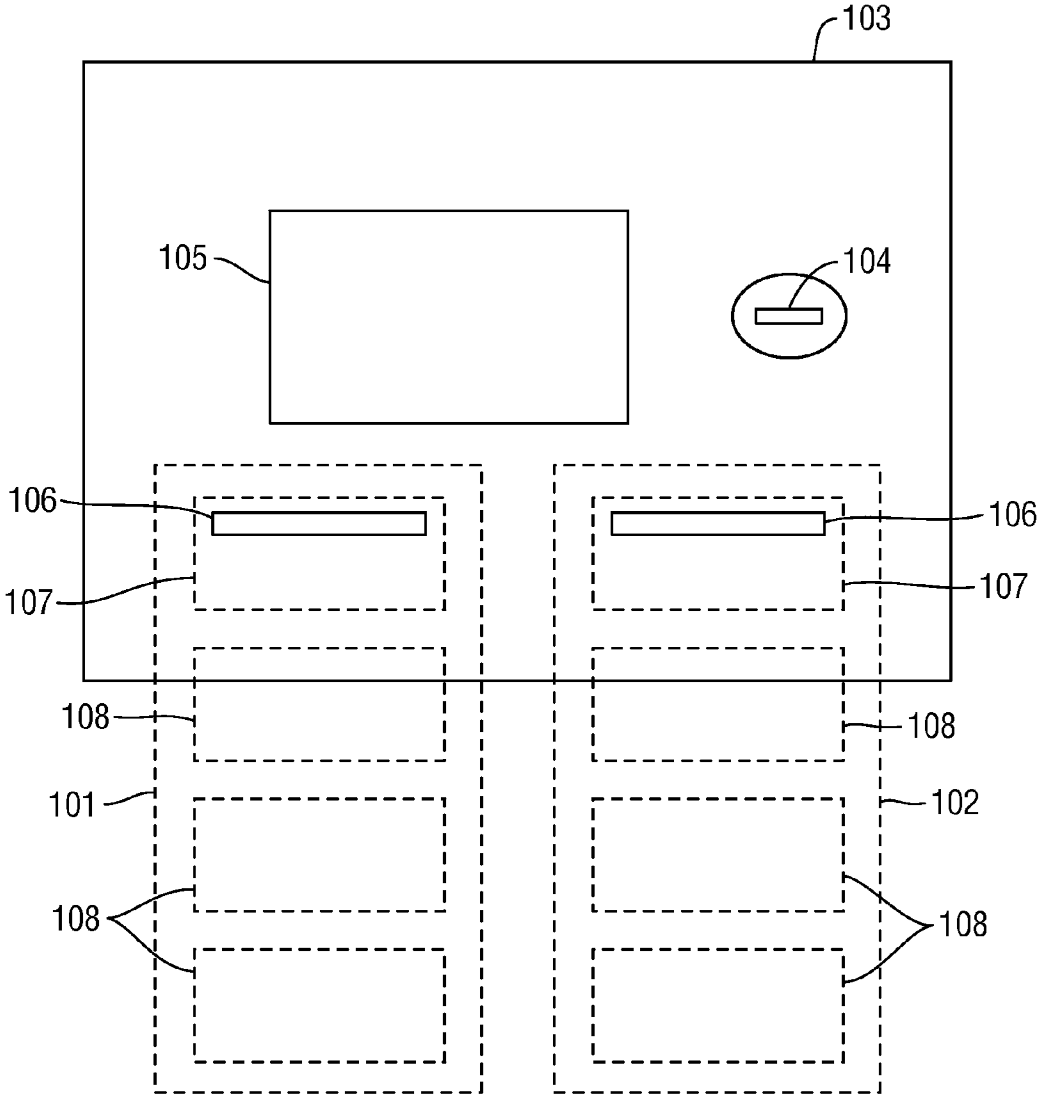
FIG. 1 PRIOR ART
FIG. 1 is a schematic diagram of an ATM comprising two dispensing units.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved.

Figure 2:
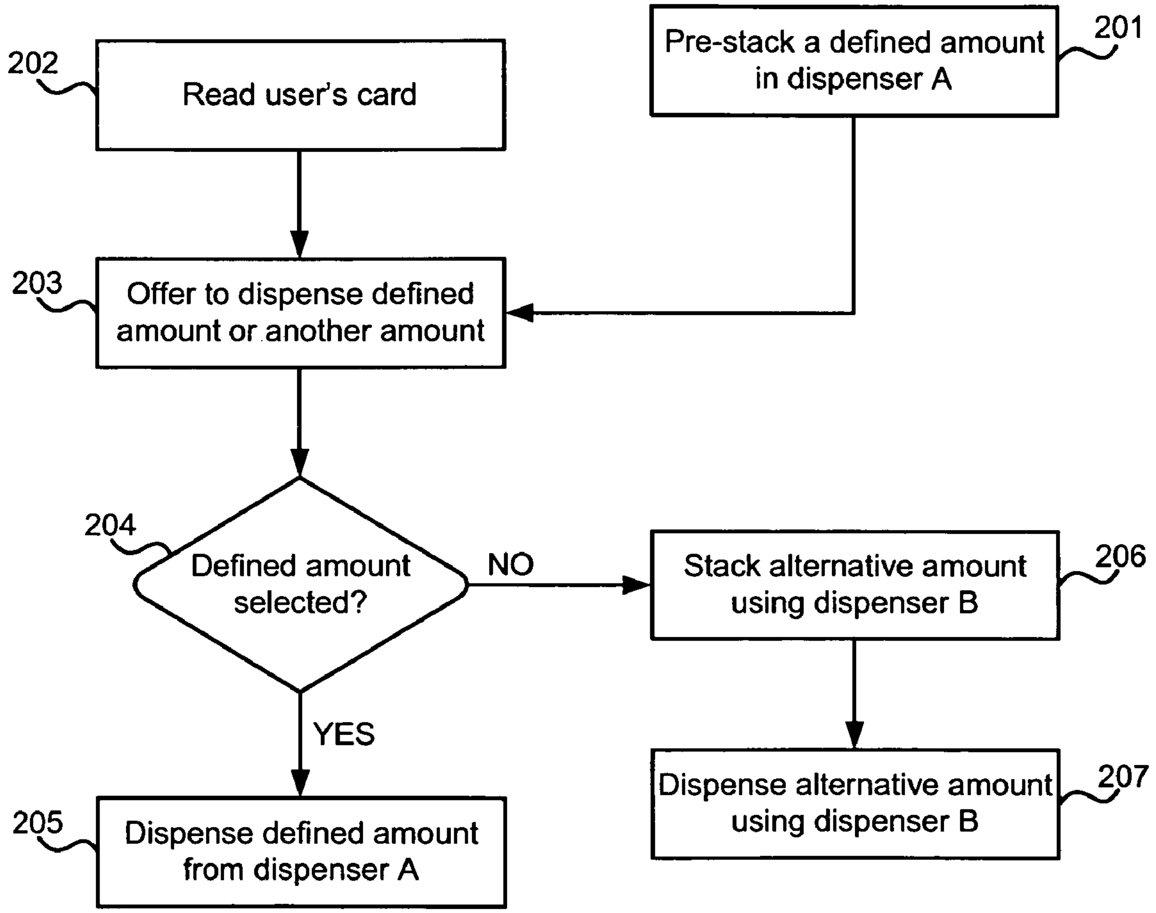
FIGS. 2-4 show flow diagrams of example methods of reducing the transaction time of an ATM.

FIG. 2 shows a flow diagram of an example method of reducing the transaction time of an ATM which comprises two dispensing units (e.g. as shown in FIG. 1 and described above) which are referred to as ‘dispenser A’ and ‘dispenser B’ for the purposes of the following explanation only. The transaction time is reduced by using one of the dispensers (dispenser A) to pre-stack a defined amount (block 201). This pre-stacked amount may be fixed by the manufacturer of the ATM or the operator of the ATM or the defined amount may be variable, and various examples are described below. The pre-stacking may occur before the customer’s card is read (block 202), substantially in parallel with reading the card or after the customer’s card has been read. In situations where a customer is identified by something other than a card, such as a mobile telephone or fingerprint, the pre-stacking may occur before customer identification, substantially in parallel with user identification or after user identification. Where the pre-stacking occurs after the customer’s card has been read or the user has been otherwise identified, the pre-stacking may occur substantially in parallel with the user authentication process (which may include PIN entry).

Having completed authentication with the customer (not shown in FIG. 2), the customer is presented with options, including withdrawing the pre-stacked amount (block 203). Other options may include cancelling the transaction, withdrawing an alternative amount, checking an account balance or any other service. If the customer selects to withdraw the pre-stacked amount (‘Yes’ in block 204), the pre-stacked amount is dispensed by dispenser A (block 205). If however, the customer chooses to withdraw another amount (‘No’ in block 204), this alternative amount is stacked by dispenser B (block 206) and then dispensed (block 207). The pre-stacked amount may be left in dispenser A.

Although FIG. 2 shows the customer being identified using a card (which is read in block 202), in other examples the customer may be identified in other ways, e.g. using a mobile telephone, fingerprint, etc. In the following description, reading of the customer’s card is used by way of example only as one method by which the customer may be identified.

Where the customer selects to withdraw the pre-stacked amount, the transaction time is reduced because the time taken to stack the notes does not form part of the transaction, but instead either occurs before the start of the transaction (i.e. before the customer inserts their card) or in parallel with other transaction processes (e.g. whilst the card is being read or the customer is otherwise being identified or whilst authentication is occurring). As the stacking process can typically take 7-10 seconds in a total transaction time which may be typically around 20-30 seconds, the overall transaction time can be reduced by around 30-50% where a pre-stacked amount is withdrawn.

The pre-stacked amount may be fixed (e.g. the same for all customers or for all ATMs operated by the same bank) or may be variable. The value of the pre-stacked amount may determined based on customer history, where this history may be based on all customers, all customers of the particular ATM provider (e.g. the most common amount withdrawn in the last 24 hours from any ATM), all customers of the particular ATM (e.g. the most common amount withdrawn in the last 7 days from the ATM), the particular customer (e.g. the most common amount withdrawn in the last month by the customer) etc. In another example it may be configured by the manufacturer, operator or customer of the ATM. Other variables may also affect the pre-stacked amount, such as the time of day, the day of the week (e.g. it may be higher on a Friday when customers may be withdrawing money for the weekend), the amount of money left in the ATM etc. The value of the pre-stacked amount may be determined by an algorithm running on the ATM or may be determined centrally and communicated to the ATM. Where the value is fixed, this may be programmed in the ATM. The maximum value of the pre-stacked amount may be limited (e.g. to £50).

Where the pre-stacked amount is based on the actual customer using the ATM, the pre-stacking (block 201) does not occur until after the customer’s card has been read (block 202) or the user has otherwise been identified (e.g. using their mobile phone, fingerprint etc). The value of the amount to be pre-stacked may be stored on the card (or other media/device used to identify the customer) or the value may be accessible in a central database based on the customer's identification details (e.g. account number and sort code or card number) or the value may be determined by a Customer Relationship Management system on authentication of the customer and this value provided to the ATM. In an example where the pre-stacked amount is based on the actual customer (or user of the ATM), the pre-stacking may occur in parallel to providing the options to the customer (block 203) or in parallel with the authentication process (not shown in FIG. 2). Use of a pre-stacked amount which is specific to a particular user's history may increase the likelihood that the pre-stacked amount is actually withdrawn.

Where the pre-stacked amount is not dependent on the actual customer using the ATM, the pre-stacking may occur at any time prior to dispensing (block 205). In an example, the pre-stacking may occur between transactions (e.g. whilst one customer removes their card and walks away from the ATM and then the next customer walks up to the ATM and inserts their card) or may occur during customer identification (e.g. during the card reading in block 202) and customer authentication (e.g. PIN entry) processes.

In situations where the pre-stacked amount is based on the actual customer using the ATM, the required pre-stacked amount for the next customer using the ATM may be the same or different. In such a situation and where the first customer does not withdraw the pre-stacked amount ('No' in block 204 followed by blocks 206 and 207), the pre-stacked amount for the first customer remains in dispenser A. Upon completion of the first customer's transaction, the pre-stacked amount may be purged (i.e. the notes may be placed in the purge or reject bin within the dispenser). In another example, the pre-stacked amount may remain in dispenser A until is determined that the appropriate pre-stacked amount for the second customer is not the same as that already pre-stacked in dispenser A, and at this point the pre-stacked amount may be purged and the new pre-stacked amount stacked for the second customer.

In some dual dispensing ATMs, one or both of the dispensing units may have recycling capability and such units may be referred to as 'recycling units' or 'recyclers'. A recycling unit is capable of returning media to one or more of the media cassettes within the ATM, such that it can be picked, stacked and dispensed in a subsequent transaction. Use of a recycler has the benefit that the number of purged notes is reduced and therefore the purge bin is less likely to become full. Also as the notes can be dispensed, the ATM will not run out of media to dispense as quickly. This mean that the intervals between servicing the ATM (e.g. for replenishment of cassettes and emptying the purge bin) may be increased. A recycling unit may also be capable of receiving media from the customer to perform deposits and in this case the recycling unit may also perform validation of the notes deposited before placing them in a media cassette.

Where dispenser A has recycling capability, instead of purging the pre-stacked amount (in the situations described above), the pre-stacked amount may be recycled and returned to a media cassette. This is particularly beneficial where the pre-stacked amount is specific for the particular customer using the ATM.

The time taken to dispense notes using a recycling unit is often considerably longer than using a dispensing unit without recycling capability. As a result, the time saving achieved through pre-stacking may be particularly beneficial when using a recycling unit.

Figure 3:
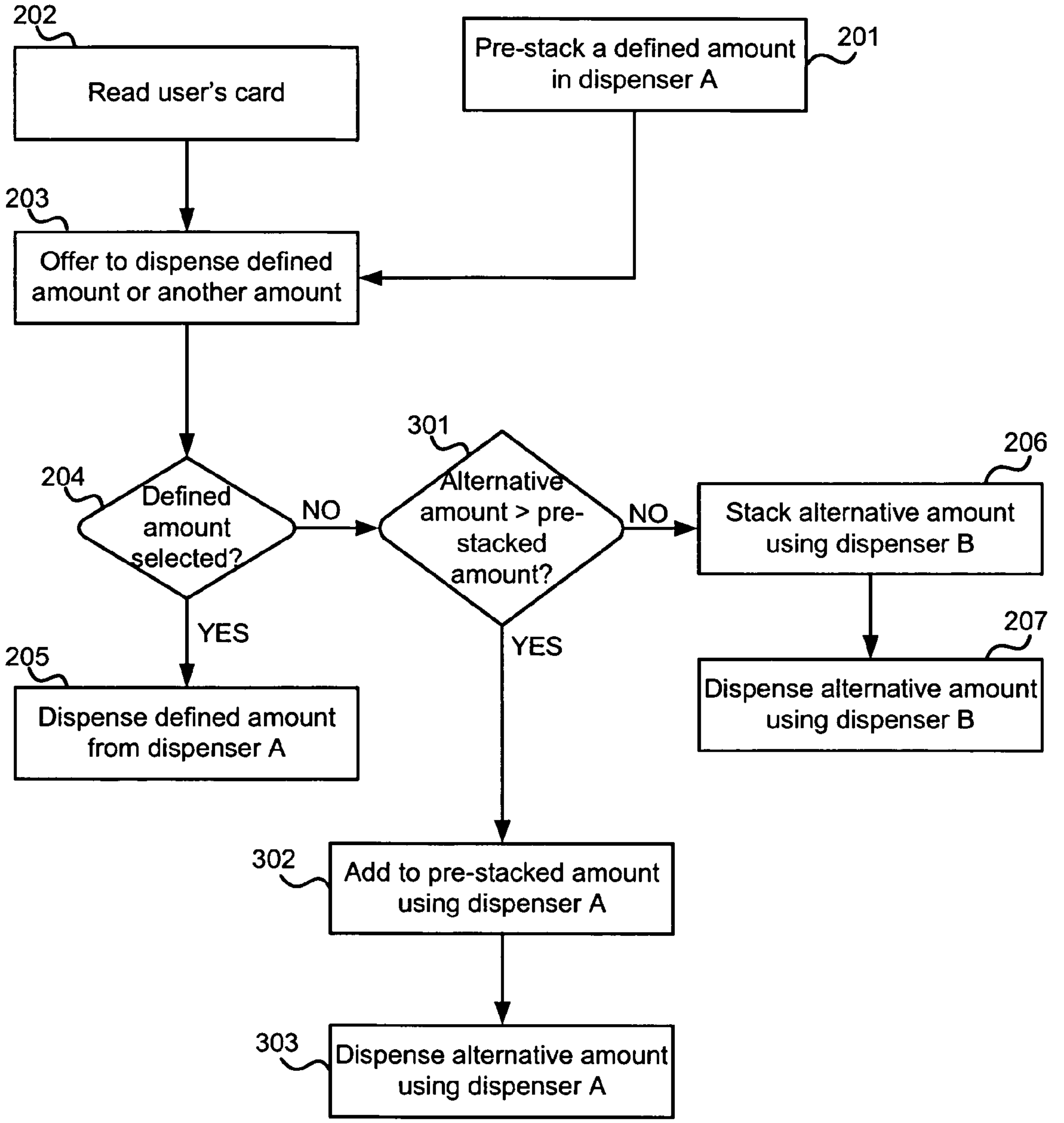

FIG. 3 shows a flow diagram of another example method of reducing the transaction time of an ATM, which is a variation of that shown in FIG. 2. In this example, the pre-stacked amount may be considered as a seed amount. The value of the pre-stacked amount may be fixed or variable and may be based on any of the parameters described above. In this example, however, if the customer chooses to withdraw a different amount to that which is pre-stacked ('No' in block 204), it is determined whether the requested amount is greater than the pre-stacked amount (block 301). If the amount that the customer requests to withdraw is less than the pre-stacked amount ('No' in block 301), the requested amount is stacked in dispenser B (block 206) and dispensed (block 207), as described above. However, if the amount that the customer requests is more than the pre-stacked amount ('Yes' in block 301), the additional notes may be added to the pre-stacked amount by dispenser A (block 302) and the resultant requested amount dispensed (block 303). At an extreme, the pre-stacked amount may be a single bank note.

Whilst having to add notes to the pre-stacked amount (in block 302) increases the transaction time compared to simply dispensing the pre-stacked amount, the transaction time is reduced compared to stacking the entire amount. This is because the time taken to stack an amount depends on the number of notes in the stack.

Figure 4:
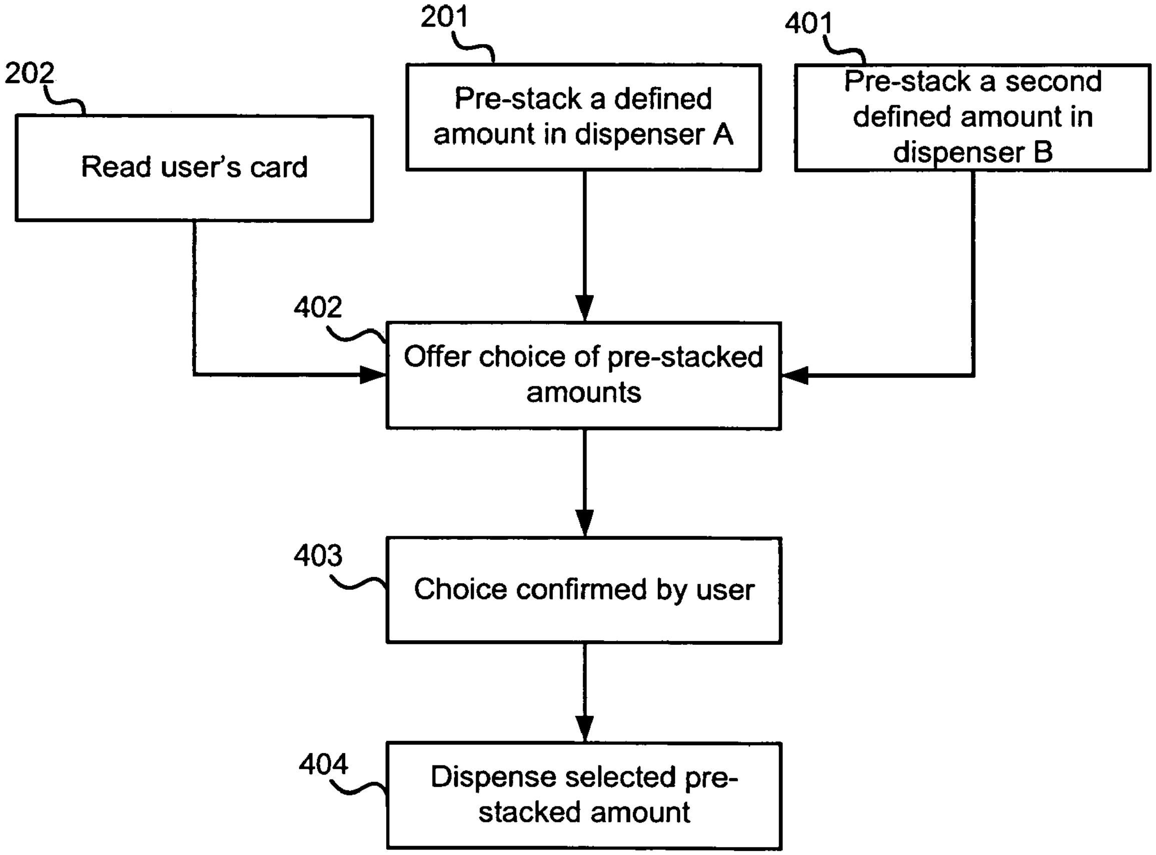

In a further variation, an ATM may only offer to provide pre-stacked amounts, as shown in FIG. 4. A different amount may be pre-stacked in each dispenser (blocks 201 and 401) and the customer may be offered a choice of the pre-stacked amounts (block 402). Once the customer confirms their choice of pre-stacked amount (block 403), it is dispensed from the appropriate dispenser (block 404). Whilst this provides limited choice for the customer, this may be beneficial for high usage ATMs.

The pre-stacking functionality described above may be enabled at all times or may be enabled on an ATM only at certain times of the day. For example, the pre-stacking functionality may be enabled during peak hours of operation of the ATM but may be disabled at times of low usage (e.g. at night) and/or at times when an ATM is more vulnerable to attack (which may also be at night). The pre-stacking functionality may be implemented at times of high demand (which may be pre-defined or determined by the ATM based on interval between transactions) but at times of lower demand the customer may be able to withdraw different amounts of money. In another example, an ATM may operate as shown in FIG. 4 during times of high demand (i.e. only pre-stacked amounts can be withdrawn) and as shown in FIG. 2 at other times.

The pre-stacking function may be disabled on detection of certain events, such as detection of a physical attack, entering supervisor mode (for maintenance, replenishment etc) or when one of the dispensers goes out of service. At the same time as disabling the pre-stacking function, any pre-stacked notes may be purged/recycled.

Whilst in the example of FIG. 2, dispenser A is shown to dispense the pre-stacked amount whilst dispenser B dispenses other amounts, this is by way of example only. In a further variation, the pre-stacking may be performed alternately by each dispenser (i.e. dispenser A pre-stacks for a first transaction and dispenser B pre-stacks for a second transaction) or the dispenser used for pre-stacking may be selected substantially at random or according to any pattern. The choice of dispenser used for pre-stacking may be dependent on the availability of notes within the dispensers in an ATM and by alternating between dispensers, the amount of notes dispensed by each dispenser may be balanced. By varying the dispenser used to pre-stack the money, the security of the ATM against a physical attack may be enhanced.

Where one of the dispensers is used mainly for dispensing the defined pre-stacked amount, the mix of notes within that dispenser can be targeted to the amount which is pre-stacked.

The mix of notes in the other dispenser may also be targeted to dispensing other amounts. As a result, replenishment may not be required so often.

In the above description money is only dispensed from one of the dispensers in any one transaction. However, in some embodiments, money may be dispensed from both dispensers in a single transaction. For example, in a variation of the method shown in FIG. 3, the additional notes dispensed (in block 302) may be dispensed using dispenser B (instead of being added to the existing pre-stacked amount by dispenser A) and then both the pre-stacked amount from dispenser A and the additional amount from dispenser B may be dispensed to the customer. In another example, in a variation of the method shown in FIG. 4, a customer may be offered three different amounts which they can withdraw: the pre-stacked amount in dispenser A, the pre-stacked amount in dispenser B or the sum of both pre-stacked amounts. If the customer selects the third of these options (in block 403), then both pre-stacked amounts are dispensed (in block 404).

Figure 5:
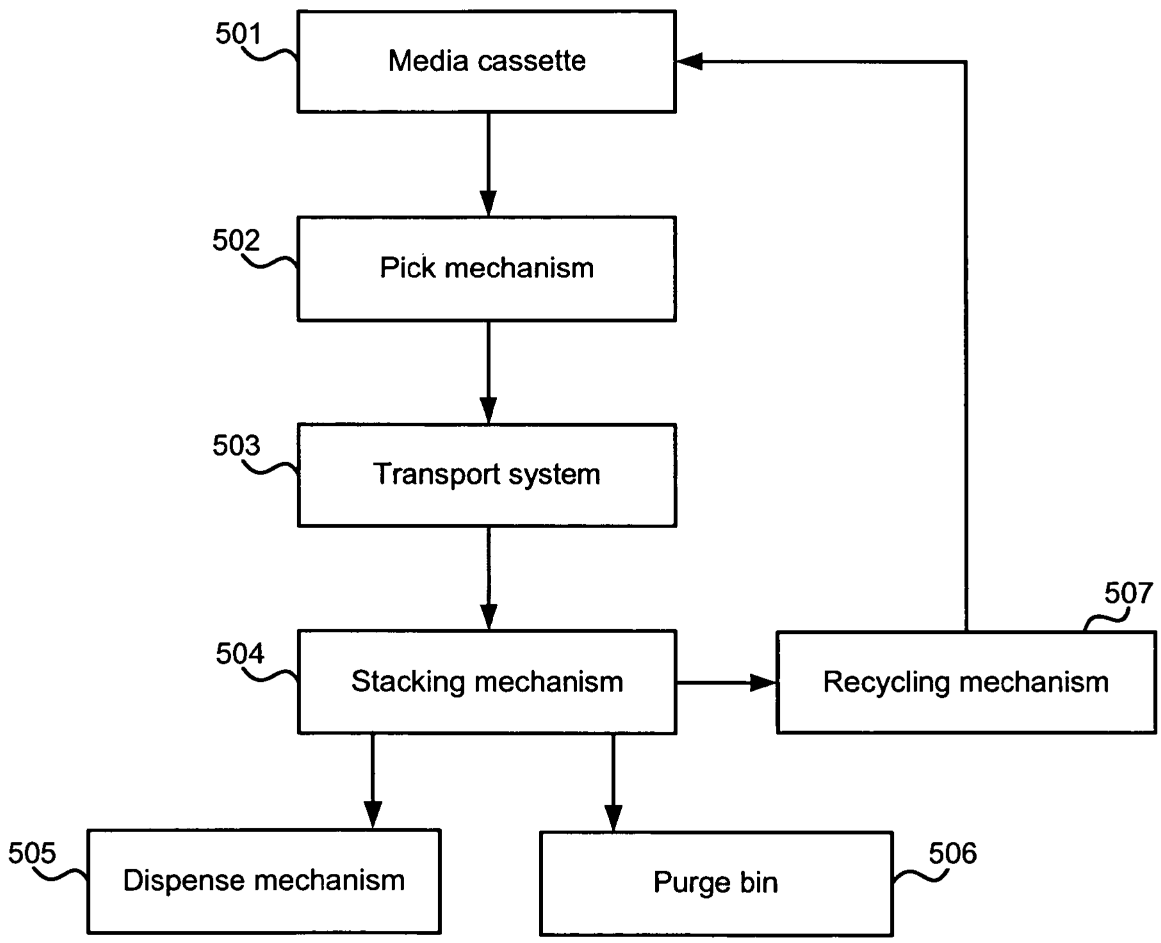
FIG. 5 shows a schematic diagram of the path traversed by media in an ATM.

In the description above, the ATM is described as comprising two dispenser units. In a further variation, an ATM may not comprise two separate dispensing units but instead some or all of the elements within the dispensing units may be common. FIG. 5 shows a schematic diagram of the path traversed by media in an ATM. An item of media (such as a bank note) starts in a media cassette 501. A pick mechanism 502 removes the media from the cassette 501 and a transport system 503 carries the media to the stacking mechanism 504. Once stacked, a bundle of media is dispensed to a customer via a dispense mechanism 505, purged into a purge bin 506, or, if the ATM has the facility, recycled (in recycling mechanism 507) back into a media cassette 501. In a dual dispenser ATM, such as shown in FIG. 1, elements 501-506 of FIG. 5 are duplicated. A dual dispenser ATM may have a duplicated recycling mechanism 507, but not all ATMs may have recycling capability 507 or only one of the dispensers may have this capability.

However, in order to implement the pre-stacking functionality described above, some or all of the elements of FIG. 5 may be common and some examples are described below:

- Elements 501-504 may be common and a dual dispense mechanism 505 may be provided. In this example, the pre-stacked amount may first be stacked by a stacking mechanism 504 and then moved into a holding position by a second dispense mechanism. The ATM may have two dispensing slots in the fascia, one for each dispense mechanism 505.
- All elements 501-506 (or 501-507) may be common but an additional holding mechanism may be provided between the stacking mechanism 504 and the dispense mechanism 505 which holds the pre-stacked amount to enable other amounts to be stacked and dispensed if required. The ATM may have only one dispensing slot in the fascia.
- The pre-stacked amount may be stacked prior to a common transport system 503, with elements 501-502 being duplicated.

It will be appreciated that there may be other variations in addition to those described above.

The pre-stacking functionality described above may also be implemented in an ATM with one dispensing unit or in an ATM with more than two dispensing units. An ATM with more than two dispensers may provide more than one pre-stacked amount (e.g. block 401 may be duplicated in FIG. 4 for each of the additional dispensers).

In a first example, an ATM with only one dispenser may function as shown in FIG. 3, with an initial amount being pre-stacked (which may in some cases only be one bank note) and the customer being able to choose to withdraw the pre-stacked amount or an amount greater than the pre-stacked amount (e.g. as in FIG. 3 with blocks 206-207 omitted). In another variation, the pre-stacked amount may be purged/recycled if the amount selected is less than the pre-stacked amount (following a 'No' in block 301) and the requested amount subsequently stacked and dispensed.

In another example, an ATM with only one dispenser may function as shown in FIG. 4 with only a single amount being pre-stacked (block 201 with block 401 omitted) and offered to a customer (in block 402). Whilst the flexibility for the customer is reduced, it may be beneficial to implement this in high volume ATMs and/or at high volume times.

Whilst the above description refers to the pre-stacking functionality being implemented in an ATM which dispenses money, this is by way of example only and the functionality may be implemented in any SST dispensing any type of media. For example, the pre-stacking functionality may be used to pre-stack pre-printed train tickets (e.g. an 'out' and a 'return' ticket) to a most common destination (e.g. a London terminus) or to pre-stack pairs of cinema or theatre tickets (which may be most commonly purchased in pairs).

Any range or device value given herein may be extended or altered without losing the effect sought, as will be apparent to the skilled person. It will be understood that the benefits and advantages described above may relate to one embodiment or may relate to several embodiments. It will further be understood that reference to 'an' item refer to one or more of those items.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The methods described herein may be performed by software in machine readable form on a tangible storage medium. The software can be suitable for execution on a parallel processor or a serial processor such that the method steps may be carried out in any suitable order, or simultaneously. This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

What is claimed is:

1. A method of operating a self-service terminal comprising:

stacking a defined amount of media by a first dispenser in the self-service terminal;

presenting a user with a plurality of options by the self-service terminal, a first option of the plurality of options corresponding to dispensing the defined amount of media by the first dispenser and a second option of the plurality of options corresponding to dispensing a different amount of media by a second dispenser in the self-service terminal;

on selection of said first option by the user, only dispensing the defined amount of media previously stacked by the first dispenser; and on selection of said second option by the user, determining the different amount of media, stacking the different amount of media by the second dispenser, and only dispensing the different amount of media by the second dispenser.

2. A method according to claim 1, wherein the defined amount of media is determined according to the user.

3. A method according to claim 2, further comprising:

recycling the stacked defined amount of media if said first option is not selected by the user.

4. A method according to claim 1, wherein the defined amount of media is determined according to a history of use of the self-service terminal.

5. A method according to claim 1, further comprising:

alternating the first dispenser used for stacking and dispensing the defined amount of media and the second dispenser used for stacking and dispensing the different amount of media.

6. A method according to claim 1, wherein the step of stacking the defined amount of media occurs during predefined time periods.

7. A method according to claim 1, further comprising:

authenticating the user by the self-service terminal between the stacking step and the presenting step.

8. A method according to claim 1, wherein stacking occurs in advance of the user operating the self-service terminal, the method further comprising:

purging the stacked defined amount of media on detection of a physical attack on the self-service terminal.

9. A method according to claim 1, wherein the self-service terminal is an automated teller machine and wherein the media is money.

10. A method according to claim 9, wherein the defined amount of media comprises a commonly dispensed amount of money.

11. A method of operating a self-service terminal comprising:

stacking a defined amount of media by a dispenser in the self-service terminal in advance of a user operating the self-service terminal to complete a withdrawal transaction, wherein dispensing the defined amount of media corresponds to one of a plurality of withdrawal options of the self service terminal; and purging the stacked defined amount of media on detection of a physical attack on the self-service terminal.

12. A method of operating a self-service terminal comprising:

determining a time of day by the self-service terminal;

when the time of day falls within a predetermine range, enabling by the self-service terminal stacking of a defined amount of media by a dispenser in the self-service terminal in advance of a user operating the self-service terminal to complete a withdrawal transaction, and enabling by the self-service terminal displaying of a withdrawal option to dispense the defined amount of media; and when the time of day falls outside the predetermined range, disabling by the self-service terminal stacking of the defined amount of media by the dispenser, and disabling by the self-service terminal displaying of the withdrawal option to dispense the defined amount of media.

13. The method of claim 12, further comprising:

purging the defined amount of media on detection of a physical attack on the self-service terminal.

14. The method of claim 13, further comprising:

disabling by the self-service terminal stacking of the defined amount of media by the dispenser; and disabling by the self-service terminal displaying of the withdrawal option to dispense the defined amount of media.

15. The method of claim 12, further comprising:

disabling by the self-service terminal stacking of the defined amount of media by the dispenser on detection of the dispenser entering an out-of-service state.

16. A method of operating a self-service terminal comprising:

stacking a defined amount of media by a first dispenser in the self-service terminal;

presenting a user with a plurality of options by the self-service terminal, a first option of the plurality of options corresponding to dispensing the defined amount of media by the first dispenser and a second option of the plurality of options corresponding to dispensing a different amount of media including a mix of different media by a second dispenser in the self-service terminal;

on selection of said first option by the user, dispensing the defined amount of media previously stacked by the first dispenser; and on selection of said second option by the user, determining the different amount of media including the mix of different media, stacking the different amount of media by the second dispenser, and dispensing the different amount of media by the second dispenser.

* * * * *